United States Patent
Mayo et al.

(10) Patent No.: US 6,529,936 B1
(45) Date of Patent: Mar. 4, 2003

(54) OBJECT-ORIENTED WEB SERVER ARCHITECTURE SUITABLE FOR VARIOUS TYPES OF DEVICES

(75) Inventors: Glenna G. Mayo, San Jose, CA (US); Jeffrey Alan Morgan, Cupertino, CA (US); Jayarami A. Reddy, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/219,272

(22) Filed: Dec. 23, 1998

(51) Int. Cl.[7] .............................................. G06F 15/16
(52) U.S. Cl. ...................................... 709/202; 709/219
(58) Field of Search ...................... 340/825.06; 700/83; 345/329; 709/201, 202, 217, 218, 219, 223, 203; 717/11

(56) References Cited

U.S. PATENT DOCUMENTS

| | | | | |
|---|---|---|---|---|
| 5,956,487 A | * | 9/1999 | Venkatraman et al. | 340/825.06 |
| 5,973,696 A | * | 10/1999 | Agranat et al. | 709/201 X |
| 5,991,802 A | * | 11/1999 | Allard et al. | 709/219 |
| 5,996,010 A | * | 11/1999 | Leong et al. | 709/223 |
| 6,052,710 A | * | 4/2000 | Saliba et al. | 709/203 |
| 6,067,558 A | * | 5/2000 | Wendt et al. | 709/202 |
| 6,101,328 A | * | 8/2000 | Bakshi et al. | 717/11 |
| 6,139,177 A | * | 10/2000 | Venkatraman et al. | 700/83 |
| 6,170,007 B1 | * | 1/2001 | Venkatraman et al. | 709/218 |
| 6,182,094 B1 | * | 1/2001 | Humpleman et al. | 709/218 X |
| 6,198,479 B1 | * | 3/2001 | Humpleman et al. | 345/329 |

OTHER PUBLICATIONS

Dr. Rose Mazhindu–Shumba, Towards the Clarification of the Object–Oriented Concepts, The 1st Information Technology Conf., Dec. 1995, Nairobi, Kenya, 5 pages.*

Richard A. Quinnell, Tech ed, Java Perks up Embedded Systems, EDN Access for Design, By Design, Aug. 1997, 7 pages.*

Ian Agranat, Engineering Web Technologies for Embedded Applications, IEEE Internet Computing, Jun. 1998, pp. 40–45.*

* cited by examiner

Primary Examiner—Patrice Winder

(57) ABSTRACT

A web access mechanism in a device is described. The web access mechanism includes at least an object that includes a plurality of functions of the device. The object includes a unique name that identifies the object and a web page that provides an interface to the object. The object also includes a plurality of properties, each of which can represent an interface to one of the functions of the object. The web access mechanism also includes a web core engine that calls one of the functions of the object to be loaded and executed in the web core engine in accordance with a request that contains the unique name of the object and the property name of the function. A method of invoking one of the functions in the web access mechanism is also described.

18 Claims, 13 Drawing Sheets

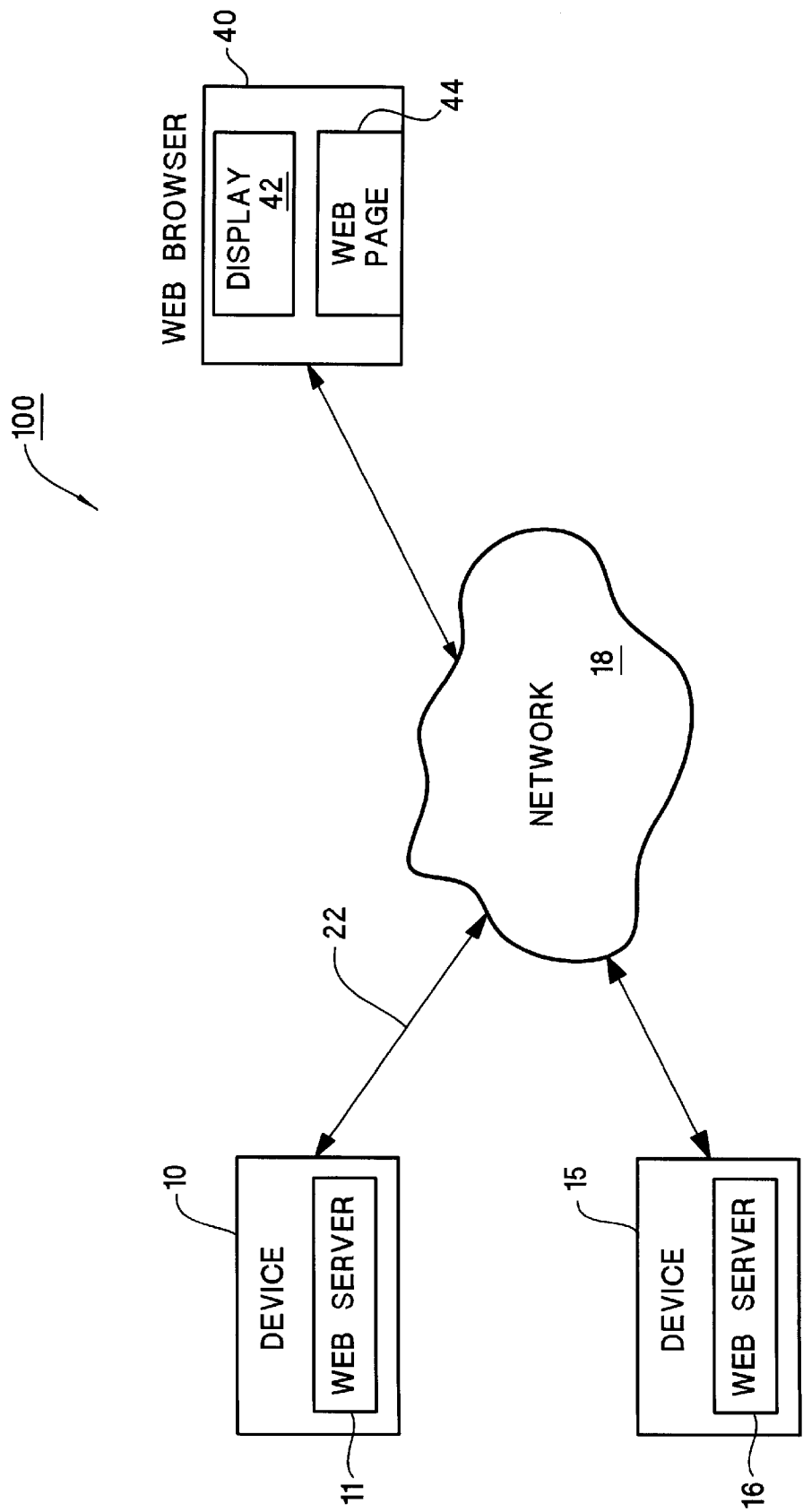

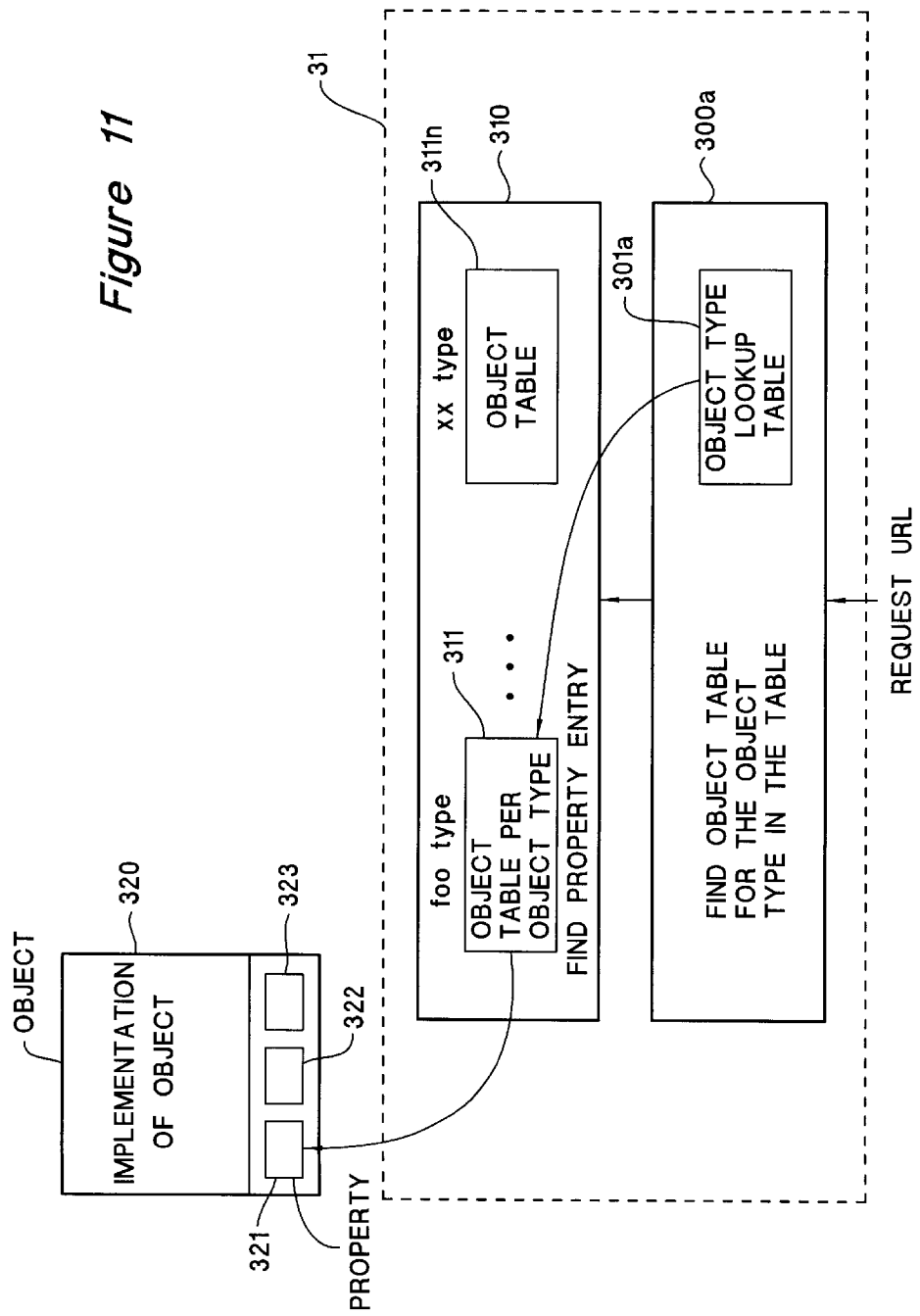

OBJECT-ORIENTED WEB SERVER ARCHITECTURE SUITABLE FOR VARIOUS TYPES OF DEVICES

BACKGROUND OF THE INVENTION

1. Field of the Invention

The present invention pertains to web access functionality. More particularly, this invention relates to an object-oriented web server architecture for different kinds of devices.

2. Description of the Related Art

An Internet network system typically includes an Internet Service Provider (ISP) system and an interconnect network that connects the ISP system with remote user terminals and other ISP systems. An ISP system typically includes a set of servers that provides Internet applications, such as electronic mail, bulletin boards, news groups, and World Wide Web access, to provide data accesses and services to users via their user terminals. Each of the user terminals includes a web browser that allows the user to access the content hosted in the web servers of the ISP systems.

The rapid growth of the Internet, widespread use of the World Wide Web, and a trend toward deployment of broadband residential networks have also led to the development of embedding the web server into electrical and electronic devices such as home appliances (e.g., washing machines), peripheral devices (e.g., scanners and printers) of a computer system, and measurement instruments (e.g., blood pressure analyzers). This means that a web server can be either implemented in one or several physically separate computer systems, or embedded within an electrical or electronic device.

Disadvantages are, however, associated with the prior art web server technology. One disadvantage associated is that the prior web servers mostly support static HTML (Hyper Text Markup Language) pages. The static HTML pages provide links that lead to the related pages. The links are hard coded text strings. When embedding a static web server into a device, the only way to modify the static pages is by editing these pages physically.

There have been some prior proposed solutions to this problem. One prior solution uses a common gateway interface (CGI) which enables the gathering and passing of user input to executable. programs (e.g., perl scripts, C programs) using a "forms" interface. In this case, the executable programs return the results to the caller in the form of a dynamically generated web page. One disadvantage of this prior proposal is that it was designed for traditional computing platforms and requires significant amount of computation and system resource to complete the task. Another disadvantage is that the web server cannot dynamically download executable programs for execution.

Another prior solution to the above problem is the Jeeves web server architecture proposed by the Sun Microsystems Inc. of Mountain View, Calif. which provides a programming environment for developing interactive web software. This solution allows creation of flexible, graphical user interfaces and powerful back-end interfaces to other system software (e.g., operating system, network, database management system). The web server could also dynamically download executable bits of code known as "servlets". The servlets are transient executable programs that can be executed locally.

One disadvantage of this prior solution is that the downloaded executable programs could not persist in the web server. This means that the downloaded code will disappear in the web server after execution. Another disadvantage is that the web server cannot dynamically download non-web executable content. This means that images, drivers, firmware, and other packages cannot be dynamically downloaded into the web server. Another disadvantage is that servlets cannot invoke a method within a servlet. The entire servlet must be downloaded and run. A further disadvantage is that because a servlet is a program that can perform a completely predefined set of tasks, there is no support for accessing one of the tasks. This makes it difficult with servlets to support a much richer information model as required by devices.

SUMMARY OF THE INVENTION

One feature of the present invention is to provide an object-oriented web server architecture that allows its capabilities to be easily extended with new objects.

Another feature of the present invention is to provide a web server architecture that is an object-oriented environment to reduce content development time and to enable rich run-time relationships between distributed web objects.

A further feature of the present invention is to provide a web server architecture that enables creation of new objects by building on existing objects and promoting code reuse.

A still further feature of the present invention is to provide a web server architecture that allows automatic selection of the user interface appropriate for a given type of device.

A still further feature of the present invention is to provide an object-oriented web server architecture that supports object-based communications via web messages at the method granularity.

A still further feature of the present invention is to provide a web server architecture that allows dynamic downloading of both executable and non-Web executable content (e.g., images, drivers, firmware) and dynamical organization of the downloaded content.

A further feature of the present invention is to provide an object model that maps onto device functionality in terms of the functions and events of the device.

A web access mechanism in a device is described. The web access mechanism includes at least an object that includes a plurality of functions of the device. The object includes a unique name that identifies the object and a web page that provides an interface to the object. The object also includes a plurality of properties, each of which can represent an interface to one of the functions of the object. The web access mechanism also includes a web core engine that calls one of the functions of the object to be loaded and executed in the web core engine in accordance with a request that contains the unique name of the object and the property name of the function.

In a device embedded with a web access mechanism, a method of invoking a function of the device remotely includes the step of providing an object that implements a plurality of functions of the device. The object includes a unique name that identifies the object, a web page that provides an interface to the object, and a plurality of properties embedded in the web page, each of which represents an interface to one of the control functions of the object. The function is then called to be loaded and executed in a web core engine of the web access mechanism in accordance with a request that contains the unique name of the object and the property name of the function.

Other features and advantages of the present invention will become apparent from the following detailed

BRIEF DESCRIPTION OF THE DRAWINGS

FIG. 1 shows a data access network system that includes a number of devices, each of which includes a web server that implements one embodiment of the present invention.

FIG. 11 shows how an object is accessed through the web core of FIG. 3.

DETAILED DESCRIPTION OF THE INVENTION

Figure 2A:
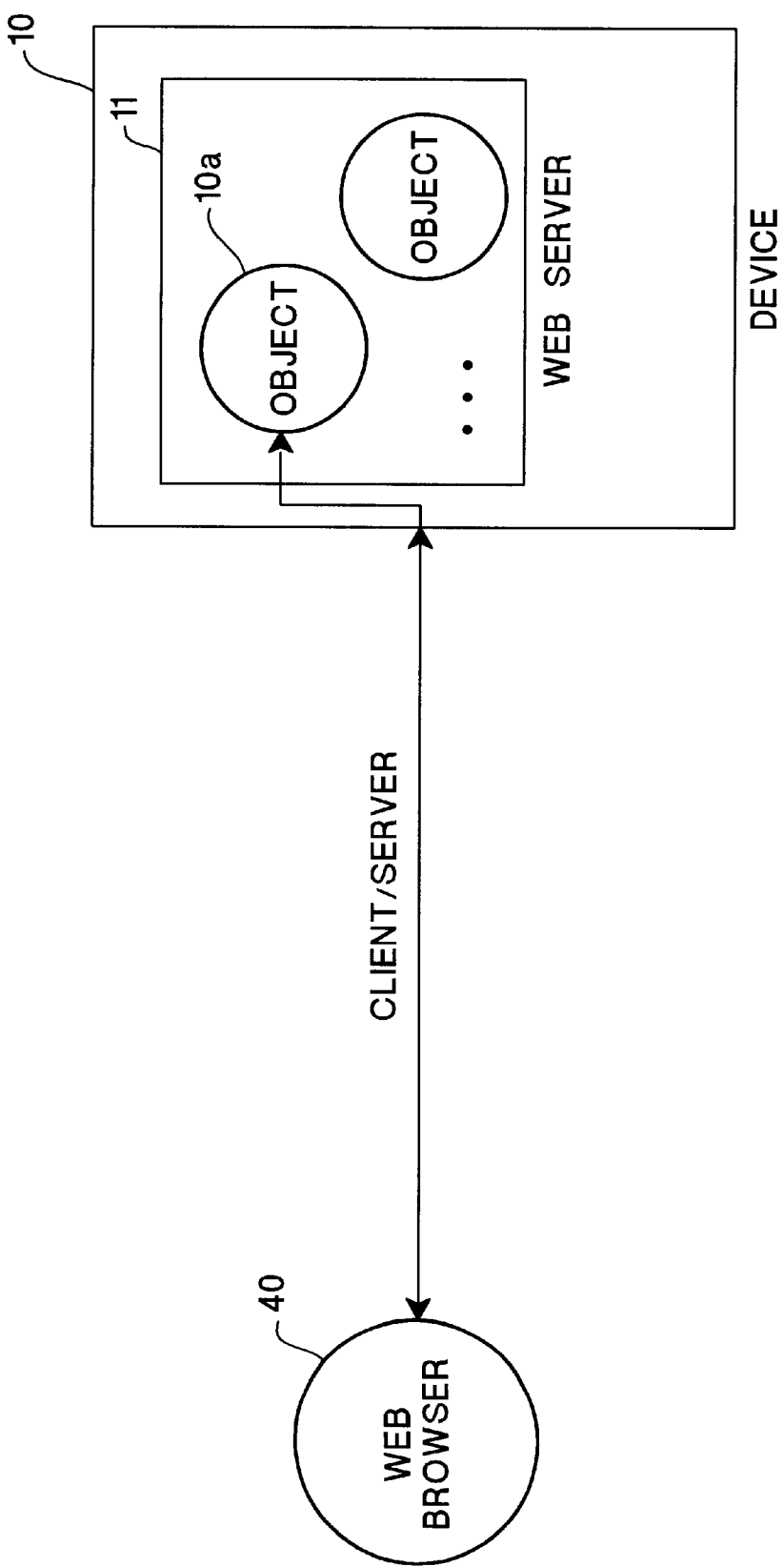
FIGS. 2A through 2C show various communication arrangements among the devices and web browser of the data access network system of FIG. 1.

FIG. 1 shows a data access network system 100 that includes a number of devices (e.g., the devices 10 and 15), each having a web server (e.g., the web server 11 or 16) that implements one embodiment of the present invention. The devices 10 and 15 are both connected to a network 18 and can be accessed by web browser 40 via the network 18.

In one embodiment, the data access network system 100 is an Internet network system. In another embodiment, the data access network system 100 is an Intranet network system. In a further embodiment, the data access network system 100 is a combination of Internet and Intranet network systems. Thus, the network 18 is an Internet/Intranet network and one or more open standard communication protocol is used for communications within the data access network system 100. The other way of accessing the Internet/Intranet could be through a dial-up virtual private network or an ad hoc wireless network.

Figure 2B:
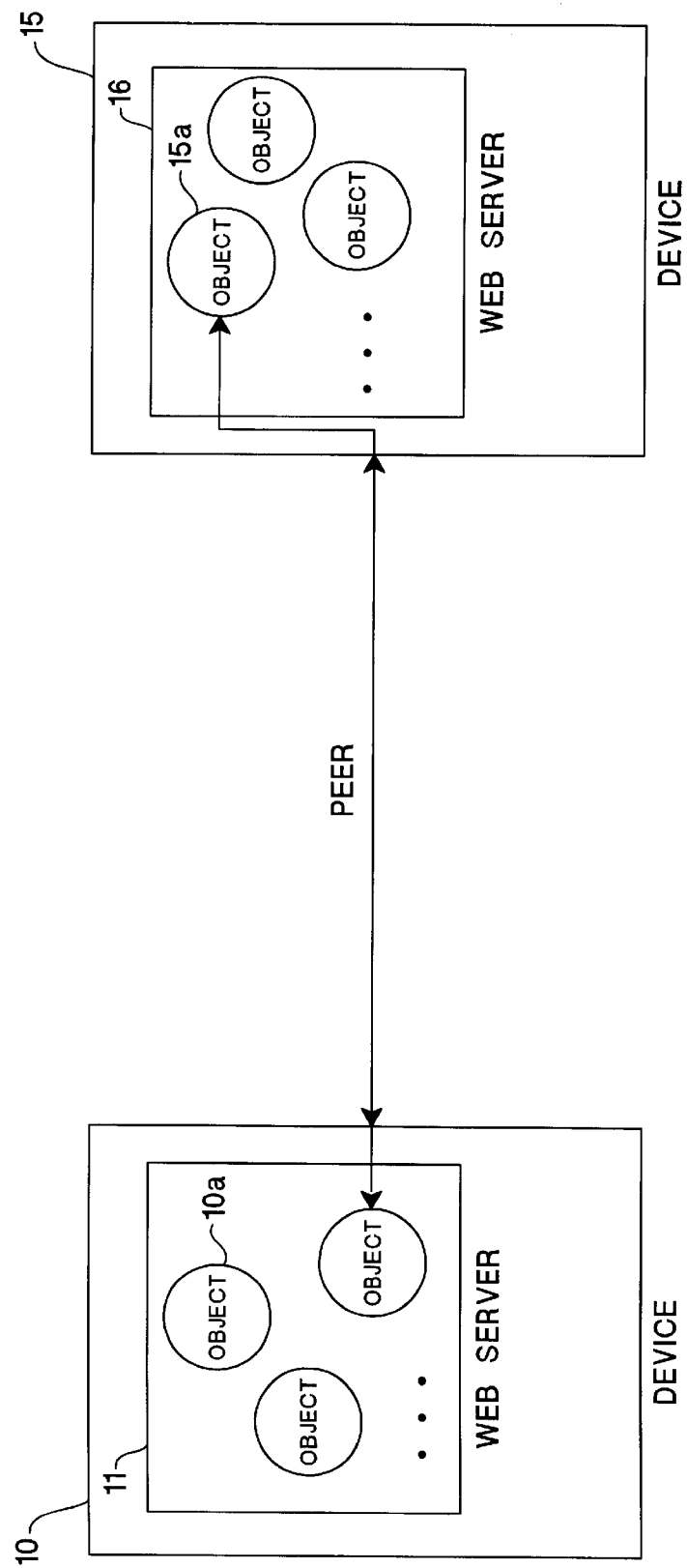
Figure 2C:
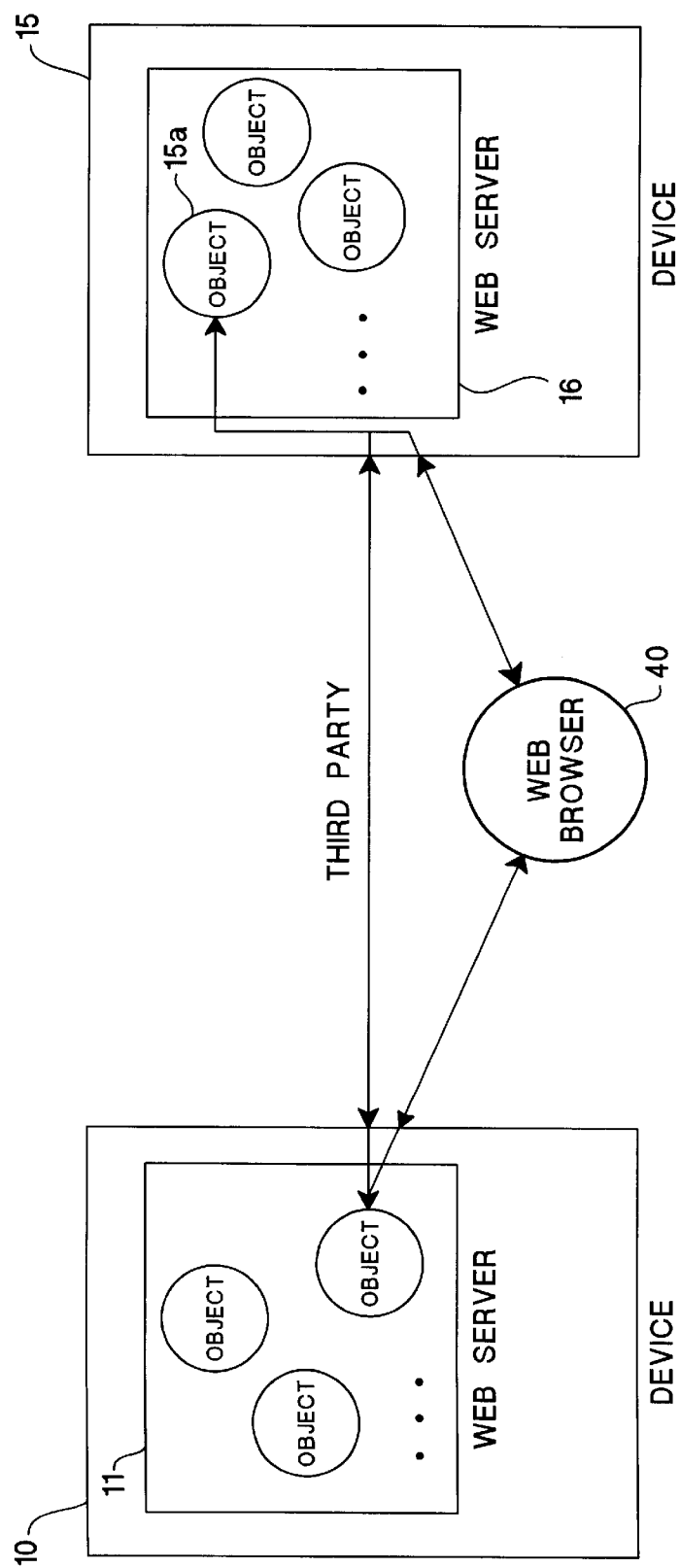

Each of the devices 10 and 15 can be universally accessed and controlled by the web browser 40 via their respective web server 11 or 16 and the network 18 using an open standard protocol (see FIGS. 2A and 2C). In addition, each of the devices 10 and 15 can also access or communicate with the other device via the respective web servers 11 and 16 and the network 18 (see FIG. 2B). The open standard protocol can be, for example, the HTTP (Hyper Text Transport Protocol) protocol.

As described above, the network 18 is enabled to carry Internet/Intranet communications. In this case, the open standard protocol is the HTTP (Hyper Text Transport Protocol) Protocol. The network 18 can be implemented with a variety of Internet/Intranet network technologies. The network 18 may include connections to the World Wide Web of the Internet for world-wide communications between one of the devices 10 and 15 and the browser 40. The network 18 may include one or more communication bridges between the World Wide Web and local area networks and home-based networks. The network 18 may include a number of Internet/Intranet Service Provider (ISP) systems connected together via interconnect network. Alternatively, the network 18 may simply be a conventional communication network.

The web browser 40 includes a display 42 for generating visual objects including text, images, multimedia objects, and graphical user interface objects. The web browser 40 includes a web page 44 that enables a user of the browser 40 to select objects and URL (Universal Resource Locator) links rendered on the display 42 and to enter information into forms rendered on the display 42. The web browser 40 may also include an audio capability that enables rendering of audio information to the user of the browser 40. The web browser 40 can be implemented by any known commercially available web browser such as the Netscape Navigator web browser of Netscape Communications Corporation of Mountain View, Calif. or the Internet Explorer web browser of Microsoft Corporation of Redmond, Wash.

The web browser 40 can be embodied in a computer system that executes a set of web browser software. Such a computer system with web browser functionality may be realized by any one of a variety of commercially available computer system platforms including Windows® platforms, Macintosh® platforms, Unix™ platforms as well as any other platforms capable of executing web browser software.

The web browser 40 may also be embodied in a variety of other devices that provide HTTP client functions and that render HTML files. Such devices include specialized hardware designed for television or telephone systems as well as low cost dedicated web browser devices and network computers.

Each of the devices 10 and 15 can be any kind of electronic or electrical device, or a computer-based device. This means the web server 11 or 16 can be implemented for different platforms. However, it is noted that it is not necessary that each of the devices 10 and 15 is a computer-based device or an electronic device. Each of the devices 10 and 15 can simply be a device (e.g., a mechanical device) with some data processing power.

In one embodiment, each of the devices 10 and 15 is an electrical or electronic device such as a printer, a fax machine, a copier, a scanner, a communication and telephone device, a television, a video player, an audio player device, a home appliance (such as a refrigerator, a washing machine, a security system), and any other type of electrical or electronic device. In another embodiment, each of the devices 10 and 15 can also be a measurement instrument, such as a blood pressure analyzer. Alternatively, each of the devices 10 and 15 can be a computer system which can be a personal computer system, a workstation computer system, a server computer system, a mainframe computer system, a mini-computer system, a notebook computer system, palm-top computer systems, network computer system, or any other type of computer system.

As can be seen from FIG. 1, each of the devices 10 and 15 includes a web server (i.e., the web server 11 or 16). Each of the web servers 11 and 16 may be physically embedded inside the respective device 10 or 15. In one embodiment, the web server 11 or 16 is physically embedded inside the respective device 10 or 15. In another embodiment, the web server 11 or 16 is not physically embedded inside the device. In this case, the web server 11 or 16 can be in a separate container of the device. The web servers 11 and 16 share the same structure, which will be described in more detail below and with reference only to the web server 11.

The web server 11 allows the device 10 to be universally accessible by web clients such as the web browser 40 or the web server 16 of the device 15 via the network 18 using, for example, the HTTP open standard protocol. HTTP is an open standard protocol that can be used to transfer multiple information encodings between network elements (e.g., HTML). The web server 11 exchanges messages with the web clients (such as the web browser 40) using the HTTP protocol on the network 18. The web server 11 receives HTTP commands or requests through the network 18. The HTTP commands specify one of a set of predetermined URL addresses for the device 10. The web server 11 is accessed by a unique URL address for the device 10. When the device 10 supports multiple resources, the web server 11 of the device 10 includes resource URL addresses to allow accesses to those resources. Thus, the URL addresses for the device 10 specify the web pages and application and control programs in the web server 11.

In one embodiment, the web server 11 runs on a virtual machine (not shown). The virtual machine provides logical abstraction of the underlying physical system (i.e., hardware and software) to the web server 11. This means that the virtual machine provides an execution environment for the web server 11. Alternatively, the web server 11 does not run on a virtual machine. The virtual machine can be implemented by known means. In one embodiment, the virtual machine used by the web server 11 provides an interpreter for Java code. The Java execution environment provided by the virtual machine enables execution of a variety of widely available web access code available for a wide variety of processor platforms. Such web access code includes code for web server and web client functionality as well as events generation functionality.

The HTTP commands or requests are used by the web clients (e.g., the web browser 40 or the web server 16 in the device 15) to obtain information from the device 10 or to invoke some control or application programs stored in the device 10 to perform specified functions. In addition, HTTP commands are generated in the device 10 to perform file transfers via the network 18 and to obtain new information and software elements for loading into the device 10 and for updating software codes in the device 10. HTTP commands are also used by the device 10 to notify the users and external software tasks of events associated with the device 10. The web server 11 is an object-oriented web server in accordance with one embodiment of the present invention. The web server 11 will be described in more detail below, also in conjunction with FIGS. 3 through 11.

Figure 3:
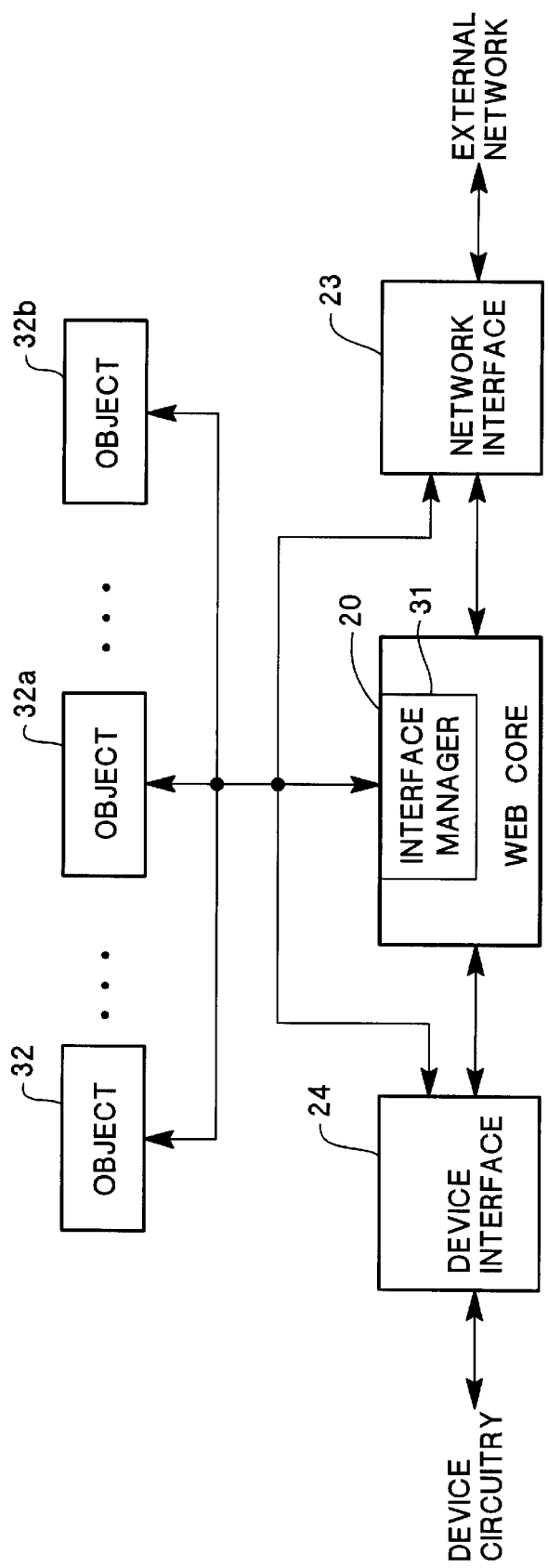
FIG. 3 shows the structure of the web server of FIG. 1, wherein the web server includes a web core and a number of objects.

As can be seen from FIG. 3, the web server 11 includes a device interface 24 that interfaces with the device circuitry of the device 10. The device interface 24 is used to provide native access to various resources within the device 10 from the web server 11. The physical aspects of the device interface 24 are dependent on the device implementation of the device 10 which may vary significantly.

The web server 11 also includes a network interface 23 that provides interface to external network. The network interface 23 enables communications to the web server 11 with the external network 18 (FIG. 1). The network interface 23 does not specify the physical medium of the network interface 23 which is device specific of the device 10. Each of the device interface 24 and the network interface 23 can be implemented by known interface technology and will not be described in more detail below.

The web server 11 also includes a web core 20 that provides web access functionality of the device 10. In addition, the web server 11 includes a number of objects 32 through 32*n*. The web core 20 also provides an execution environment for the objects 32–32*n* that represent resources of the host device 10. The web core 20 is the engine of the web server 11. As can be seen from FIG. 3, the web server 11 has an object-oriented architecture in accordance with one embodiment of the present invention.

The object-oriented architecture of the web server 11 allows for inheritance. This means that two or more objects of the web server 11 can share a common interface. The common interface only needs to be defined once, and then other objects can provide or support the defined interface. For example, two objects of the web server 11 can have the identical interface which only needs to be defined once.

The object-oriented architecture of the web server 11 also allows for containment. This means that an object can encapsulate other objects (see FIG. 8). The object-oriented architecture of the web server 11 also allows for polymorphism. This provides each object with the ability to have the same property/method with different parameters and information. For example, the same method (e.g., method "foo") that supports different parameters can have multiple implementations.

Figure 4:
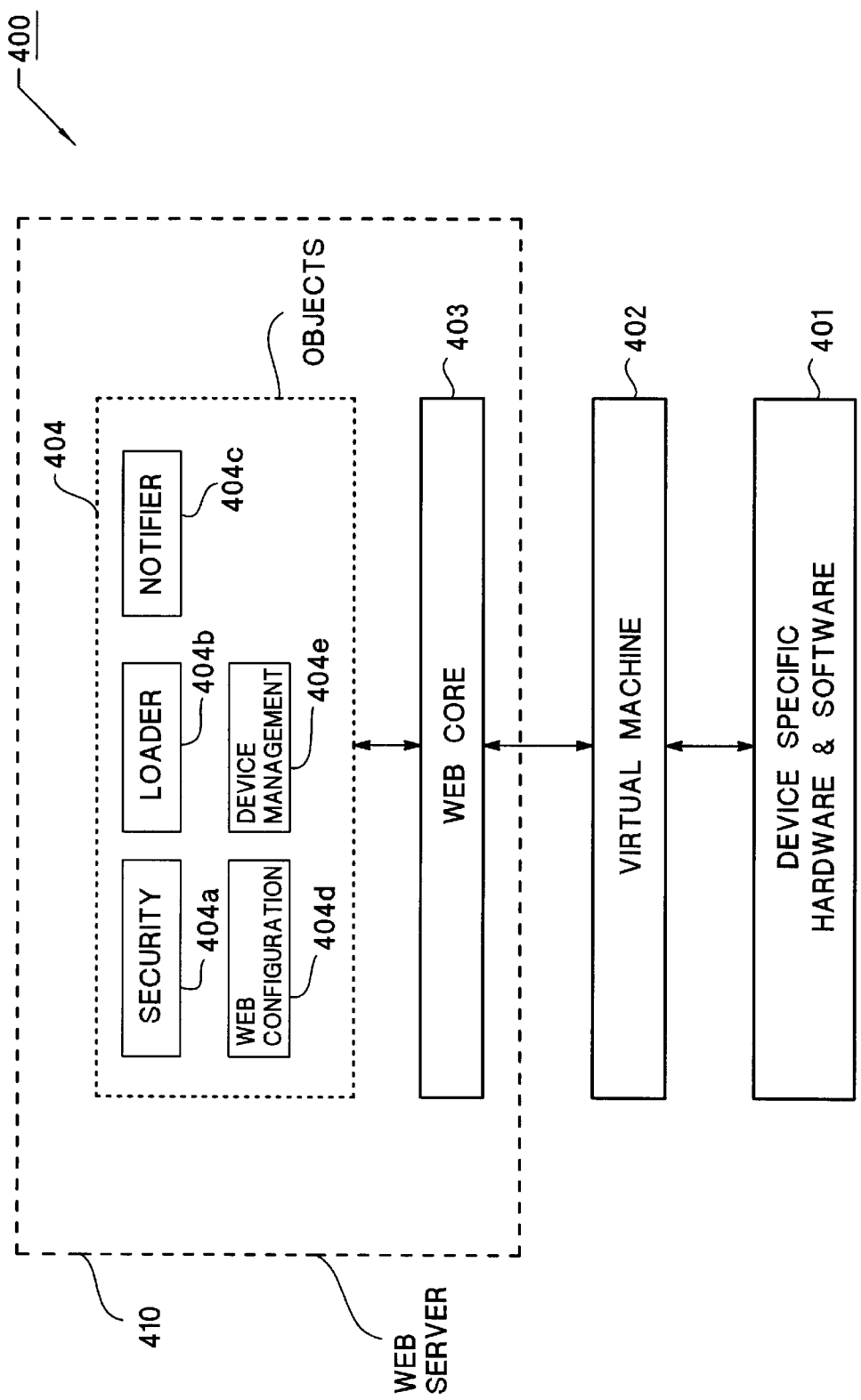
FIG. 4 shows one example of the structure of the web server embedded in a device.

In other words, the distributed object-oriented web architecture of the web server 11 allows a client to access and execute software or functions originating from anywhere of a network system using standard protocols. The object-oriented web server 11 also allows automatic selection of the user interface appropriate for a given type of device, supports object communications, and allows dynamic downloading of both executable and non-Web executable content (e.g., images, drivers, firmware), and then dynamic organization of the downloaded content. Furthermore, the object-oriented web architecture of the web server 11 allows inheritance of methods and functionality, and enables creation of new objects by building on existing objects and promoting code-reuse. The object-oriented web architecture of the web server 11 also allows self-modeling, linked objects. FIG. 4 shows an example of the structure of an object-oriented web server 410 embedded in a device 400. As can be seen from FIG. 4, the web server 410 includes a number of objects 404. These objects 404 may include a loader object 404*b*, a notifier object 404*c*, a security object 404*a*, a web configuration object 404*d*, and a device management object 404*e*. The web server 410 also includes a web core 403 that operates with objects 404. The device 400 includes device specific hardware and software 401 which is coupled to a virtual machine 402 that is coupled to the web core 403.

Referring back to FIG. 3, each of the objects 32–32*n* represents a resource of the device 10. For example, if the device 10 includes printing, scanning, and diagnosing resources, the web server 11 can include an object representing the printing resource, an object for the scanning resource, and an object for the diagnosing resource.

Each resource implements a collection of functions, methods, or operations. They are hereinafter collectively referred to as functions. The functions perform computation and/or interact with the device circuitry of the host device 10 via the device interface 24. This means that each of the functions is supported by the device 10. For example, the printing resource can include the functions of printing double sided pages, printing some pages of a document, printing multiple copies of a document, and printing the document in the landscape format, etc. The functions can also be referred to as operations, methods, or control programs. The functions may be carried out by control programs or data to invoke or control device circuitry of the device 10 to perform the functions.

In accordance with one embodiment of the present invention, each of the objects 32–32n representing a resource of the device 10 has a web page (i.e., identifiable via a URL address). This means that each of the objects 32–32n can be accessed by an external web browser or other objects/resources using a URL address or link via the network interface 23 of the web server 11. To access the resource, HTTP requests are made to the object's URL address. The web page of an object is the default operation of the object that can be accessed by simply doing an HTTP GET or POST request on the URL that names the object. The default operation does not require any input and returns its results as, for example, MIME (Multipurpose Internet Mail Extensions) encoded data.

In addition, each of the objects 32–32n includes a number of properties, each of which provides an interface to one of the functions of the resource. Each property can also be accessed via a URL address. The properties of an object provide structured access to the resource represented by the object. The structure of each of the objects 32–32n will be described in more detail below, also in conjunction with FIG. 5.

Figure 5:
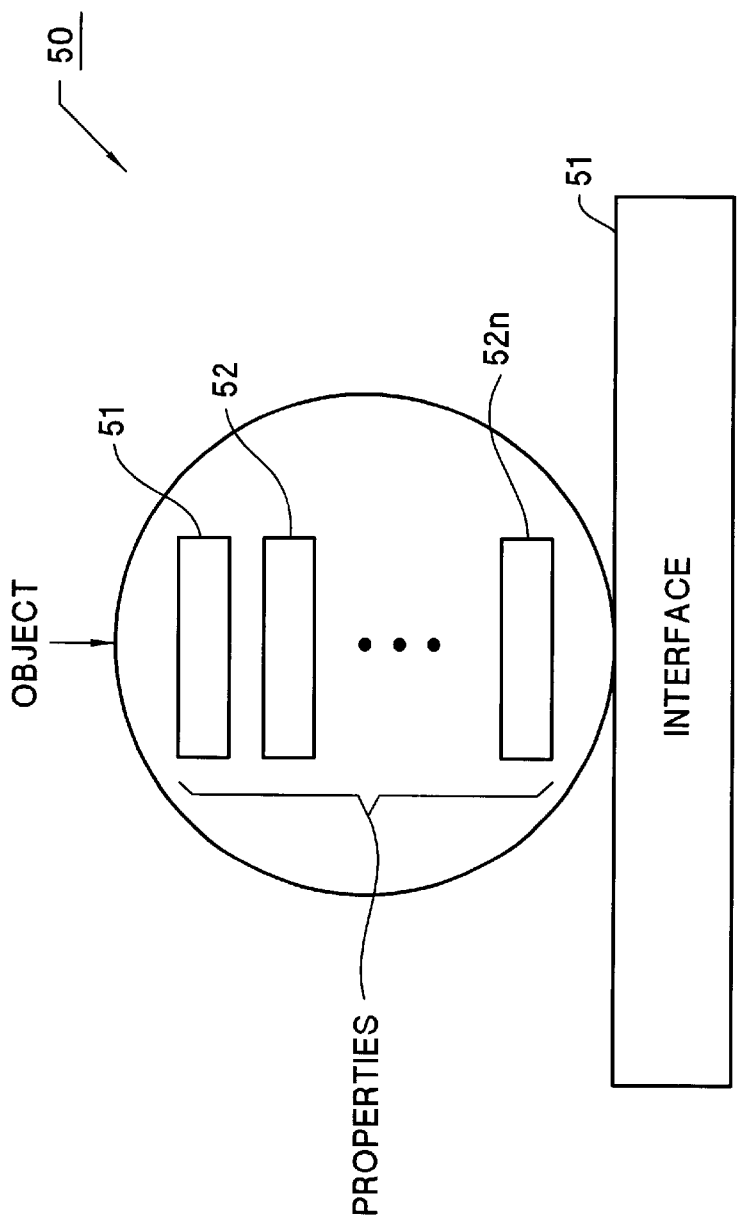
FIG. 5 illustrates the structure of one of the objects shown in FIG. 3.

As can be seen from FIG. 5, the functional structure of an object 50 is shown, which can be any one of the objects 32–32n. The object 50 provides an interface (i.e., interface 51) to the resources that the object 50 represents. The interface 51 define a set of properties 52–52n for the object 50. The object 50 may include more properties than those defined by the interface 51. The interface 51 provides access to the object 50. The interface 51 lists the properties of the object 50 that the object 50 decides to expose to outside callers (i.e., objects or clients). The interface 51 is associated with an object type (defined by MIME) contained in the request URL address for the object 50. This means that the properties 52–52n of the object 50 may be classified into various types if the object 50 includes more than one interface.

Although FIG. 5 shows that the object 50 includes one interface (i.e., 51), an object may have one or more interfaces. For example and as can be seen from FIGS. 6 and 7, the object 100 includes one interface 101 that represents one type (e.g., RED) of properties while the object 200 in FIG. 7 includes two interfaces 201–202 that represent two types (e.g., RED and BLUE) of properties (i.e., 203–203n and 204–204n). The object type information is used to distinguish the object's implementation or instance so that the correct executable code may be loaded when the object is invoked. The object type string in the request URL address is used to determine which interface of the object the request should be routed to. An object that has multiple interfaces will essentially implement multiple types. A single instance or implementation of an object can exist for each named resource the device supports. This can also be done with a method per resource in a single object.

Referring back to FIG. 5, each of the properties 52–52n provide an interface to one of the functions of the object 50. Each of the properties 52–52n can also be accessed via a URL address. The property is the unit of distribution for the object 50. This means the URL address for a property may be distributed to other objects in other devices (e.g., the device 15), or stored as a hyper-text link in the web page of the object 50. This also means that an external web browser or objects can access a particular function of a particular function of a particular resource via the respective property of the object using the URL addresses of the property and the object. The general format of an object URL is shown below:

http://machine-name.domain/object-name.object-type?property-name=return-result-encoding&argument-name=argument-value . . .

The property-name in the request URL is used to determine which property (i.e., interface to a function) the request should be routed to. The return-result encoding in the request URL is used to specify the data format of the returned operational result as, for example, MIME encoded data (usually text/html). The argument-name and argument-value provide data inputs to the function invoked. Alternatively, a URL may include more than one argument name and value.

The object 50 and its properties 52–52n can be implemented using known programming languages. For example, the object 50 and its properties 52–52n can be written in the Java language from Sun Microsystems, Co. of Mountain View, Calif. Similarly, each of the functions of the resource represented by the object 50 can be written in a known programming language, such as perl scripts, C languages, or C++. When a programming language is used to define both (1) the object 50 and its properties 52–52n and (2) the resource and its functions, only a device native interface is needed to access device capabilities. This also allows the control functions of the device 10 to be invoked without requiring a traditional web technology (e.g., CGI) to connect to each of the control functions from the web server.

The structure of object 50 allows the object 50 to communicate with other objects by invoking interfaces using, for example, the HTML forms interface, Java's RMI, sockets, or event notification. Data is returned to the client as a dynamically generated HTML stream, thus removing the need for storage-consuming static web pages.

Moreover, the object 50 (FIG. 5) also allows the web core 20 (FIG. 3) to support any of the communication schemes as shown in FIGS. 2A–2C. In FIG. 2A, the client (e.g., the web browser 40) invokes an interface of an object 10a in the device 10 and the web server 11 in the device 10 does the task and returns results dynamically to the client in an HTML stream. In FIG. 2B, the object (i.e., either 10a or 15a) in the web server (i.e., 11 or 16) of either device 10 or 15 initiates a request and exchange of messages. Data exchange can be done in any form agreed upon by the devices. In FIG. 2C, the client (e.g., the web browser 40) can send a request to two objects in two different devices (e.g., the devices 10 and 15) and the two objects process the request together. In the above illustrated arrangements, there is no requirement for a user interface to display results. Instead, the objects use the "argument-name", "argument-value", and "return-result-encoding" strings in the URL to define data passage.

Furthermore, the structure of the object 50 allows the web access capabilities of the web server 11 (FIG. 3) to be dynamically extended by creating and installing new objects. This can be done at run time without stopping operation of the web server 11. In addition, because an object can access another object, an object can contain other objects, thus inheriting their functions. This is referred to as object containment. Through object inheritance of functions, content development time for the web objects can be significantly reduced.

Figure 8:
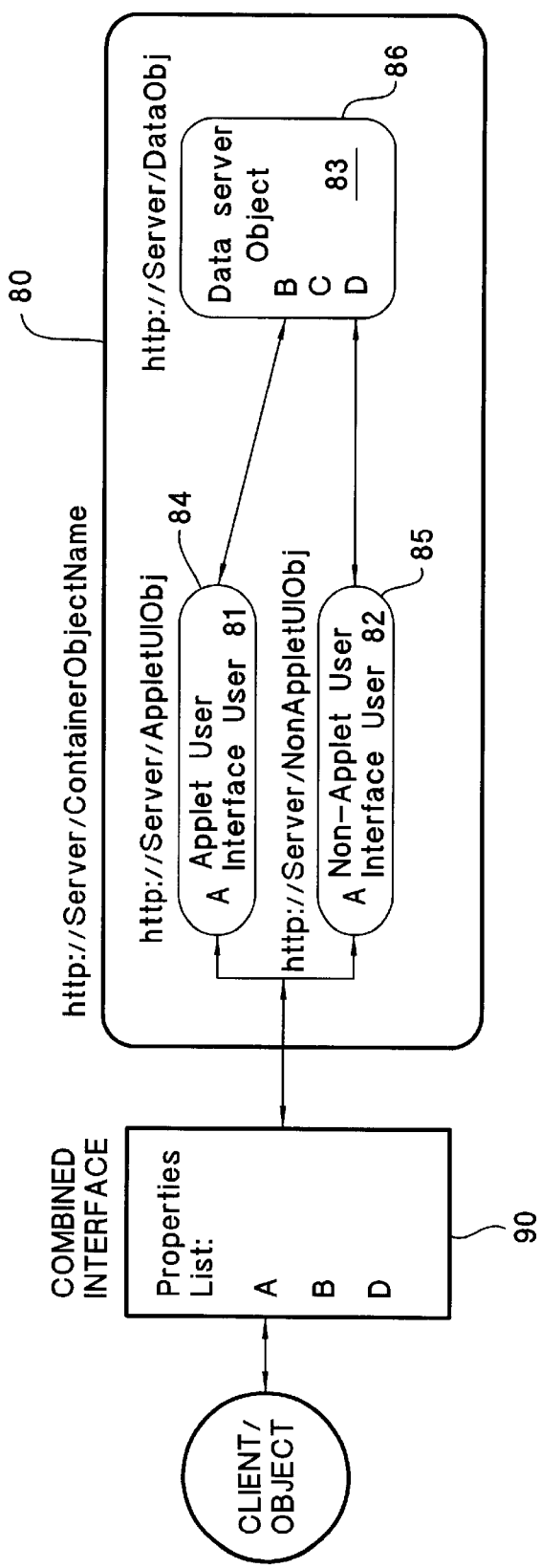
FIG. 8 shows the web object containment scheme in accordance with one embodiment of the present invention.

FIG. 8 shows one arrangement of the object containment. As can be seen from FIG. 8, each of the objects 80–83 has a unique URL address and can be invoked separately. For example, the Applet User Interface Object 81 has a "http://Server/AppletUIObj" URL address included in the property A of the object. The object 80 is a container object which has the properties 84–86. Each of the properties 84–86 provides an interface to one of the contained objects 81–83. The container object 80 provides an opaque package, which allows a request to invoke one of the contained objects 81–83. This is done by having the container object 80 to invoke the interface of the appropriately contained object to serve the request. The object containment also allows creation of new objects by building on existing objects and promote code-reuse.

Figure 10:
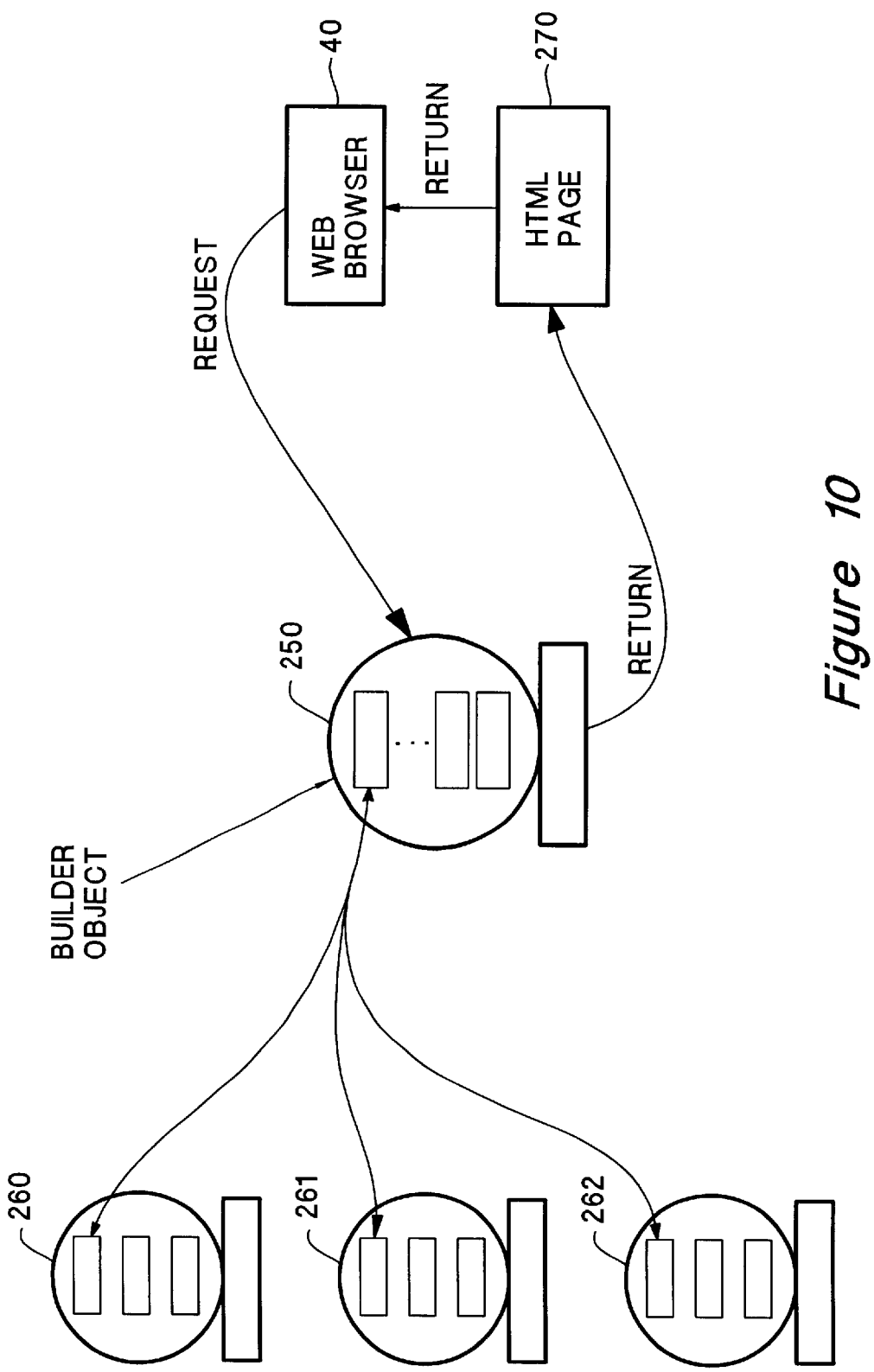
FIG. 10 shows an example of a builder object.

The structure of object 50 of FIG. 5 also enables creation of builder objects. FIG. 10 shows one example of a builder object 250. As can be seen from FIG. 10, the builder object 250 provides linkage between the request or caller (e.g., browser 40) and other objects 260–262. The builder object 250 allows the object's web page to aggregate results from many web queries. This is especially useful when the request or caller needs to view many properties at once. The builder object 250 can save the results from multiple properties from multiple linked objects in an HTML page 270 or provide the result directly to the caller (e.g., the browser 40).

Referring back to FIG. 3, the objects 32–32*n* may be stored in the device 10 (FIG. 1) and may be dynamically downloaded into the device 10 at run time. Thus, the objects 32–32*n* can be installed or modified dynamically at any time. The objects 32–32*n* may be loaded locally from the device 10, or accessed via a URL address from a remote site, thus enabling the web server 11 with little local memory or storage capacity. Object installation is persistent across server restarts and system boots.

The objects 32–32*n* are downloaded with a package. A package is a file which contains the following required information which includes the URL address to each object type file. The required information also includes the information of the object type, the object name, the object hyper-text link ID, the number of threads to create or to instantiate the object, a URL to each file or package that the object depends on (executable or not), and an object description (including the unique object name). In addition, a package may have some optional information that includes the information of an icon (for a graphical representation) and a list of object URLs and/or object property URLs to which this object is related and should be linked (if these objects exist). Packages can be edited by an administrator of the web core 20.

If no optional lists of related URLs are included, then the default config. object is notified of the existence of the new object. This object provides a flat object link table for object lookup.

Figure 9:
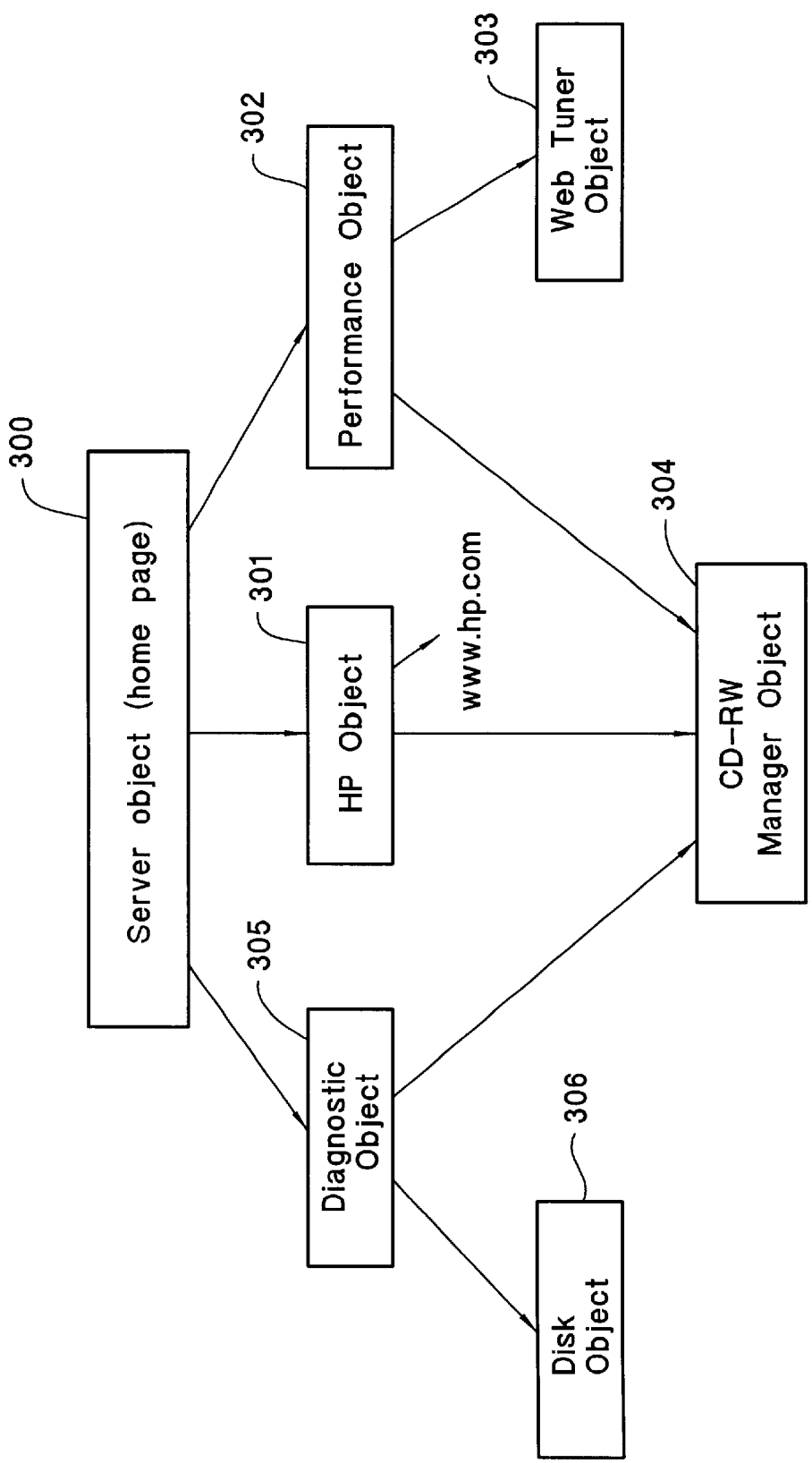
FIG. 9 shows an example of a simple web object link graph.

If the related URL list is provided, then all objects on this list will be notified so that they may provide links to the new object as appropriate. These related links allow for the creation of a self-modifying, graphical linked object space. Graphs may be cyclical or acyclical (e.g., hierarchical). FIG. 9 shows an example of a possible object hyper-link structure. As can be seen from FIG. 9, the graph is a hierarchical structure that contains a mix of object links, traditional HTML web hyper-text links (i.e., the object 301), and web invoked executable codes such as CGI scripts, ISAPI programs, etc. A newly installed object (e.g., CD-RW manager object 304) may also check other installed objects (e.g., 300–303, 305 and 306) to determine which already loaded objects should be linked into it. These links are, however, not hard-coded into a static web page. In this case, the object decides how to place them at run-time. The link graph such as the one shown in FIG. 9 may also be modified by the administrator of the web server if needed. Modification occurs by notifying the objects of the changes, not by modifying or generating a web page as a CGI script might do.

The web core 20 (FIG. 3) may include an interface manager 31. The functions of each of the objects 32–32*n* are invoked by the web core 20 via the interface manager 31. The web core 20 provides an execution environment for the objects 32–32*n*. In one embodiment, the web core 20 enables communications using HTTP GET and HTTP POST methods.

The web core 20 may also include a loader and a notifier (both are not shown). The loader loads new information into the web core 20 and installs new software elements or objects in the web server 11 in response to requests from the external web clients such as the web browser 40 (FIG. 1). The notifier provides the capability of notifying software objects and users of events associated with the device 10. As described above, the loader enables loading or installing of other software objects or elements that perform specified functions in the device 10. The web core 20 also provides an application programming interface (API) (also not shown in FIG. 3) for the loader, notifier, and other software elements The web core 20 also provides a library of routines for use by objects such as the loader, notifier, and other software elements.

The loader and notifier may also be implemented as objects and export an API (application programming interface). In one embodiment, each of the loader and notifier is implemented by a loader object and a notifier object. Alternatively, the loader and notifier may not be implemented by objects.

The basic function of the web core 20 includes a network manager function, a configuration manager function, a request manager function, and a content manager function. The network manager function implements the networking processing for the web core 20. The network manager function receives the HTTP requests and sets up communication sessions to pass the HTTP requests to the request manager function.

The configuration manager function maintains the local state of the web core 20. The local state information is managed in a persistent manner so that the web core 20 returns to a consistent state when restarted. In one embodiment, the configuration manager function provides the information indicating which objects need to be started when the device 10 is started. The information includes the location of the code that implements the object, name of the object and MIME type information relating to the object. This information is used to build the object table.

The request manager function handles the bulk of the HTTP protocol processing. The content manager function receives the requests from the request manager function and, if the request is going towards one of the objects 32–32*n*, locates the interface manager in the interface manager 31 for the request. This is done based on the MIME type information parsed from the request. Once the interface manager has been found for the request, the content manager function of the web core 20 will pass the request to the interface manager for the request for further processing. If no interface manager is found or located, an error message will be sent to the requester or caller.

In addition, the web core 20 may also have a scalable architecture. This means that the web core 20 packages some basic web functionality and other functions into different functional modules. Each of the functional modules can be packaged in a, for example, zip file and can be dynamically installed into the web core 20. This allows the web server 11 to provide different functionality with different configurations to different platforms ranging from non-computer electrical devices to computer systems. In other words, the scalable structure of the web core 20 allows dynamic and customized configuration of the web server 11, which allows the web server 11 to meet the functionality and memory constraints of non-computer electrical devices as well as general purpose computers. Moreover, the scalable structure of the web core 20 also facilitates future functional expansion of the web server 11 because when new web service functions are implemented, they can be made available in modular form and the new functions can be incorporated into the web server 11 by adding the new functional modules into the web core 20. In addition, the new modular functions can be delivered to the device 10 for upgrade of the web server 11 via the network 18.

Figure 6:
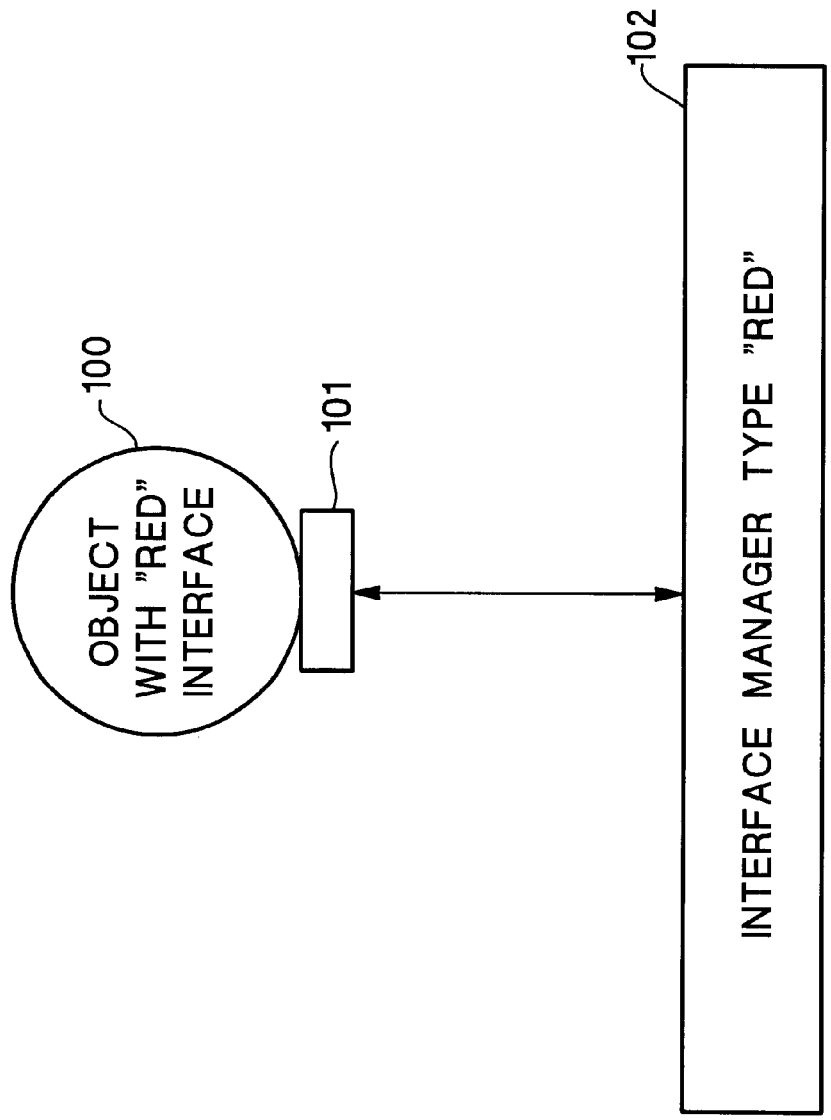
FIG. 6 shows an object with one interface.
Figure 7:
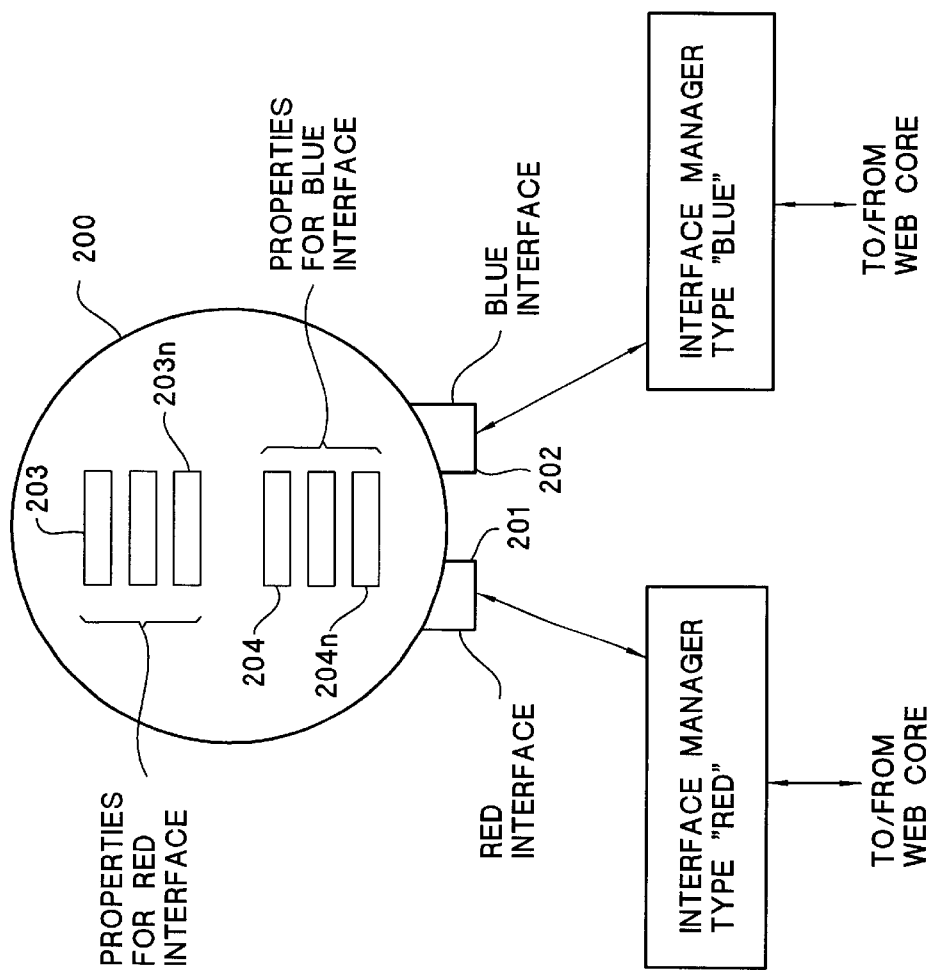
FIG. 7 shows an object with multiple interfaces.

The interface manager 31 includes a number of interface managers, each for an object interface. In other words, a single interface manager exists for each unique object interface exported by objects on the device 10. Each interface manager supports all of the object interfaces that implement the interface associated with the interface manager for the object. Objects with multiple interfaces will have an interface manager for each interface. FIGS. 6 and 7 show the relationship. The structure and the operation of the interface manager 31 is shown in FIG. 11, which will be described in more detail below and employing the following request URL as an example.

http://machineA.com/this.foo?propertyA= HTML&argument1=Foo

As can be seen from FIG. 11, the interface manager 31 receives the request URL from the web core 20 (FIG. 3) at the step 300a. The interface manager 31 obtains the object name, object type, property name, argument name and value, and return result format information from the request URL. The interface manager 31 then uses the object type information to look up the object instance in an object type lookup table 301a. From the object type lookup table 301a, the object table of a particular object type can be located. As can be seen from FIG. 11, the search in the object type lookup table 301a at the step 300a indicates the object table 311 is for the "foo" type. As can be seen from FIG. 11, each object type has an object table (e.g., 311–311n).

The object table keeps track of all objects of the same type that are currently running on the device 10. This table is used by the interface manager 31, at the step 310, to map an object name to an object instance and to find the appropriate property in the object instance. The object instance information will allow code entry points to be computed in order to invoke property requests or the object's home-page.

Once the target object has been found or created, the interface manager 31 then checks the request URL to determine if property information has been specified in the request. If there is no property information, the interface manager 31 calls an entry point (e.g., 321, 322 or 323) provided by the object implementation (e.g., 320) which will return the object home page to the request. Here, the request URL does specify property information (i.e., propertyA). In this case, the interface manager 31, at the step 310, uses the property information 321 to determine which entry point on the object implementation 320 to call.

In the foregoing specification, the invention has been described with reference to specific embodiments thereof It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An object-oriented web access mechanism embedded in a device, the object-oriented web access mechanism comprising:
    (A) at least an object that implements a plurality of functions of the device, wherein the object further comprises:
        (I) a unique name that identifies the object;
        (II) a web page that provides an interface to the object; and
        (III) a plurality of properties, each of which can represent an interface to one of the functions of the object and are accessed via a URL; and
    (B) a web core engine that provides an execution environment for the object in accordance with a request that contains the unique name of the object and a property name of the function.

2. The object-oriented web access mechanism of claim 1, wherein each of the properties includes an Internet address such that each of the functions of the object can be accessed.

3. The object-oriented web access mechanism of claim 2, wherein the address for one of the properties further comprises:
    (I) an argument field that allows data input to the function; and
    (II) a result field that allows the function, when executed, to return results.

4. The object-oriented web access mechanism of claim 1, wherein the object can be installed or modified dynamically at run-time and organized relative to the other objects without stopping the web core engine.

5. The object-oriented web access mechanism of claim 1, wherein the object includes a plurality of types, each allowing an external request to access one of a plurality of properties belonging to the type.

6. The object-oriented web access mechanism of claim 1, wherein some of the properties of the object provide interface to other objects to allow the object to contain the other objects such that functions of the other objects can be inherited by the object.

7. The object-oriented web access mechanism of claim 1, further comprising a plurality of objects, including a builder object that links multiple properties from multiple objects together.

8. The object-oriented web access mechanism of claim 7, wherein builder object provides the results of the linked multiple objects either through its web page or directly to a client.

9. The object-oriented web access mechanism of claim 1, wherein the web core engine further comprises an interface manager that calls the object based on the unique name of the object, the Internet addresses of the object and the corresponding property defined in a request for the object.

10. The object-oriented web access mechanism of claim 1, further comprising another object that shares the interface provided by the web page.

11. The object-oriented web access mechanism of claim 1, further comprising a plurality of objects, some of which can be contained by other objects.

12. The object-oriented web access mechanism of claim 1, wherein one of the properties of the object has different parameters and multiple implementations.

13. In a device embedded with an object-oriented web access mechanism, a method of invoking a function of the device, said method comprising:
- (A) providing an object that implements a plurality of functions of the device, wherein the object further comprises:
  - (I) a unique name that identifies the object;
  - (II) a web page that provides an interface to the object; and
  - (III) a plurality of properties embedded in the web page, each of which can represent an interface to one of the functions of the object and are accessed via a URL; and
- (B) executing the function in an execution environment provided by a web core engine of the object-oriented web access mechanism in accordance with a request that contains the unique name of the object and a property name of the function.

14. The method of claim 13, further comprising:
- (I) providing an argument field for the Internet address of one of the properties that allows data input to the corresponding function;
- (II) providing a result field for the property that allows the function, when executed, to return results;
- (III) providing a specification of the type of the returned property; and
- (IV) providing an Internet address to each of the properties such that each of the functions of the object can be accessed, wherein the object only needs a URL address to invoke the property of another object.

15. The method of claim 13, further comprising:

dynamically installing or modifying the object at run-time without stopping the web core engine.

16. The method of claim 13, further comprising:

containing multiple objects in the object by allowing some of the properties of the object to provide interface to the multiple objects such that functions of the multiple objects can be inherited by the object.

17. The method of claim 13, further comprising:

linking multiple properties of multiple objects together in a builder object, wherein the builder object provides the results of the linked multiple objects either through its web page or directly to a client.

18. The method of claim 13, further comprising:

grouping the properties of the object into a number of types, each type allowing an external request to access one of the properties belonging to the type via an interface of the type.

* * * * *